United States Patent [19]

Sedlmayr et al.

[11] Patent Number: 4,767,161
[45] Date of Patent: Aug. 30, 1988

[54] SAFETY BELT ARRANGEMENT

[75] Inventors: Gerhard Sedlmayr, Hamburg; Jürgen Grassmuck, Pinneberg, both of Fed. Rep. of Germany

[73] Assignee: Autoflug GmbH & Co. Fahrzeugtechnik, Rellingen, Fed. Rep. of Germany

[21] Appl. No.: 865,879

[22] Filed: May 21, 1986

[30] Foreign Application Priority Data

May 21, 1985 [DE] Fed. Rep. of Germany ....... 3518121
May 21, 1985 [DE] Fed. Rep. of Germany ....... 3518125

[51] Int. Cl.⁴ .................................................. B60R 21/10
[52] U.S. Cl. ................................. 297/472; 280/806; 297/216; 297/477
[58] Field of Search ............... 297/216, 474, 472, 470, 297/477, 479; 280/806, 808

[56] References Cited

U.S. PATENT DOCUMENTS

| 2,993,732 | 7/1961 | Walker | 297/216 |
| 3,182,923 | 5/1965 | Botar | 297/477 X |
| 3,547,490 | 12/1970 | Stoffel | 297/479 |
| 3,871,470 | 3/1975 | Schwanz et al. | 280/806 X |
| 3,957,281 | 5/1976 | Pech | 297/470 |
| 3,994,513 | 11/1976 | Courtis et al. | 280/808 |
| 4,008,909 | 2/1977 | Otani et al. | 297/470 |
| 4,015,860 | 4/1977 | Tisell et al. | 280/806 X |
| 4,328,976 | 5/1982 | Tsuge et al. | 297/479 X |
| 4,492,348 | 1/1985 | Ziv et al. | 297/479 X |
| 4,531,762 | 7/1985 | Sasaki et al. | 280/808 X |

FOREIGN PATENT DOCUMENTS

| 548240 | 11/1957 | Canada | 297/474 |
| 1277682 | 9/1968 | Fed. Rep. of Germany | 297/474 |
| 2428564 | 1/1976 | Fed. Rep. of Germany | 280/806 |
| 2543784 | 5/1977 | Fed. Rep. of Germany | 280/808 |
| 1048413 | 11/1966 | United Kingdom | 297/470 |

Primary Examiner—Peter A. Aschenbrenner
Assistant Examiner—Thomas A. Rendos, Jr.
Attorney, Agent, or Firm—Becker & Becker, Inc.

[57] ABSTRACT

A safety belt arrangement, especially one having a lap belt as a constituent of the belt system. One end of the lap belt is connected to a part that is secured to the vehicle, and the other end of the lap belt is provided with a belt buckle part. An anchoring member is provided as a carrier for the other belt buckle part, with the ends of the lap belt, as well as the anchoring member, being connected with a tensioning mechanism that operates in opposite directions. This tensioning mechanism is disposed between the anchoring elements that act as guide elements for the lap belt portion and for the anchoring member, which includes a cable section. The tensioning mechanism is secured to the one end of the lap belt and to the anchoring member via connections that are freely movable in the direction toward the guide elements, and are also movable relative to one another.

8 Claims, 6 Drawing Sheets

SAFETY BELT ARRANGEMENT

BACKGROUND OF THE INVENTION

1. Field of the Invention

The present invention relates to a safety belt arrangement, especially for motor vehicles, that includes a lap belt as an integral portion of the belt system. One end of the lap belt is attached to an element that is connected to the vehicle. The other end of the lap belt is provided with a belt buckle part. An anchoring member is provided as a carrier for the other belt buckle part. The ends of the lap belt on the one hand, as well as the anchoring member on the other hand, are connected with a tensioning mechanism that operates in opposite directions.

2. Description of the Prior Art

The present invention can be used for all types of safety belts. For example, the present invention can be used with three-point safety belts where the belt extends as a shoulder belt from a belt reeling mechanism, which is generally mounted on the B- or C-column of the vehicle (for which as generally known such letter designations are used to refer to the front or windshield column as the A-column; the middle column referred to as the B-column generally laterally adjoining the backrest of the front seat; and the rear column referred to as the C-column in the rear quarter panel or trunk region of the vehicle), to a belt buckle part (generally a buckle tongue), and from there as a lap belt to a point of securement on a part of the vehicle. The present invention can also be used with a lap belt where the belt extends from the point of securement over the lap of the person who is strapped in to another point of securement that is next to the person and is in the form of a belt buckle lock having an anchoring member. These two types of belts are frequently combined with one another, especially on the rear seats of automobiles, with the persons sitting on the outsides each being strapped in via three-point belts, and with the person sitting between them in the middle being strapped in by a simple lap belt.

Safety belt arrangements for restraining a person generally have the problem that in the event of an accident, for example a collision, the strapped-in persons have not only their upper body thrown forward, but in particular can also slide forward beneath the lap belt, as a result of which the lap belt assumes an unfavorable position with regard to the geometry of the belt, cutting into the abdomen region of the body of a person. This applies in particular, of course, for persons secured merely by a simple lap belt.

U.S. Pat. No. 4,015,806-Tisell et al dated Apr. 5, 1977 corresponding to German Offenlegungsschrift No. 25 43 068 Karlstedt et al dated Apr. 8, 1976 proposes for the front seat of automobiles that the lap belt be essentially simultaneously tensioned at both ends, with the two lower points of securement of the lap belt being connected via lines with a pyrotechnical drive mechanism that is disposed below the seat and has two pistons that are movable in opposite directions; in the event that the mechanism is triggered, these pistons are driven apart in opposite directions, thus tensioning the lap belt. The lines that lead from the lap belt to the piston are preferably guided via rollers. However, such an approach cannot be used with current safety belt systems.

It is therefore one object of the present invention, for a safety belt arrangement, to provide a direct tensioning of the lap belt independent of the tensioning of the shoulder belt.

A further problem encountered during tensioning of lap belts is that the anchoring points for the lap belt connection on the one hand, as well as the anchoring member as the belt buckle carrier and hence constituent of the portion that extends around the abdomen region of the strapped-in person, and hence the geometric course of the lap belt, are predetermined by the vehicle. This means that, for example, for a small person, the lap belt on both sides, or at least on one side, is at a distance from the body, so that even if the lap belt is tensioned, there is still enough space for the person to slide through beneath the belt. In addition, the lap belts extend rearwardly to the points of securement at a spacial acute angle relative to the securement plane, so that the belts do not optimally extend around the strapped-in person. Moreover, as a result of the acute angle high forces result at the points of securement, so that at this location a high effort is extracted to secure the strapped-in person. This problem attains particular weight with regard to the back seats of automobiles, since in particular the back seat can be occupied by up to three persons, so that here the points of anchoring could be placed particularly unfavorably.

It is therefore a further object of the present invention to improve the geometry of the course of the lap belt at the same time that the latter is tensioned, and to conform the belt geometry to all seat configurations.

SUMMARY OF THE INVENTION

The safety belt arrangement of the present invention comprises: a first anchoring member, which is secured to the vehicle; this anchoring member is in the form of a first guide element, with a first one of the ends of the lap belt being attached to this guide element, with the other end of the lap belt being provided with a first belt buckle part; a second guide element, which is secured to the vehicle; a second anchoring member, which is in the form of a cable section, is supported by the second guide element, and is provided with a second belt buckle part that cooperates with the first belt buckle part; and a tensioning mechanism that interconnects the first end of the lap belt and a portion of the second anchoring member that is remote from the second belt buckle part; in an overhung arrangement, the tensioning mechanism operates in opposite directions, with the first end of the lap belt and the last-mentioned portion of the second anchoring member being freely displaceable toward and away from their associated guide elements, and being movable relative to one another.

First of all, the present invention has the general advantage that as a result of the tensioning mechanism, which acts upon conventional anchoring elements, no structural alterations of the safety belt system are required, so that the safety standard associated therewith can be retained.

The improvement advantage achieved with the inventive proposal is that the portion of the belt arrangement formed by the lap belt, the anchoring member, and the tensioning mechanism, and which extends around the abdomen region of the strapped-in person, is reduced by the oppositely directed movement of the lap belt and the anchoring member, so that the lap belt itself is tensioned. In so doing, in an advantageous manner, and depending upon the existing resistant, either the lap belt portion or the anchoring member is initially retracted where the resistance is the least, i.e. where the existing belt slack is the greatest. The inventive overhung pyrotechnical drive mechanism for the belt tensioning moves relative to the bottom part of the motor vehicle until a force equilibrium is achieved between the lap belt on the one hand and the anchoring member on the other hand. Since the tensioning movement of the anchoring member with the buckle lock tensions not only the lap belt but also the shoulder belt due to the belt strap being looped about the buckle part, the excess energy that still exists after the force equilibrium has been achieved serves to tension the upper portion of the belt, since when the lap belt is already tensioned, the further movement of the buckle on the floor of the vehicle brings about a tensioning of the shoulder belt.

Two specific embodiments are particularly advantageous for realizing the objects of the present invention. In one of these embodiments, a linear tensioner is disposed between the guide elements, and in the other embodiment a belt reeling mechanism having a rotary tensioner that acts upon its shaft is provided.

Beyond the advantages already achieved with the present invention, one preferred embodiment proposes, in addition to the overhung arrangement of the tensioning mechanism, to also arrange the anchoring mechanism for the lap belt portion, as well as the anchoring member in the form of the aforementioned guide elements, in such a way that they are displaceable, with this displacement capability being made possible only when the tensioning mechanism is triggered. The particular advantage of this arrangement is that there results a belt orientation that extends more or less at right angles to the fastening plane of the belt components, with the belts moving towards the person. Thus, in addition to shortening the belt run when the lap belt is tensioned, starting with the lap of the passenger, the respective shortest connection to the anchoring point of the belt system on the vehicle is automatically adjusted, so that after the conclusion of the tension movement, there is no longer any free space to allow the person that is strapped in to slide through. Hence, the inventive arrangement results not only in an improvement of the belt geometry but also results in elimination of the belt slack.

Further advantageous features of the present invention will be described in detail subsequently.

BRIEF DESCRIPTION OF THE DRAWINGS

These objects, and other objects and advantages of the present invention, will appear more clearly from the following specification in conjunction with the accompanying schematic drawings, in which.

DESCRIPTION OF PREFERRED EMBODIMENTS

Figure 1:
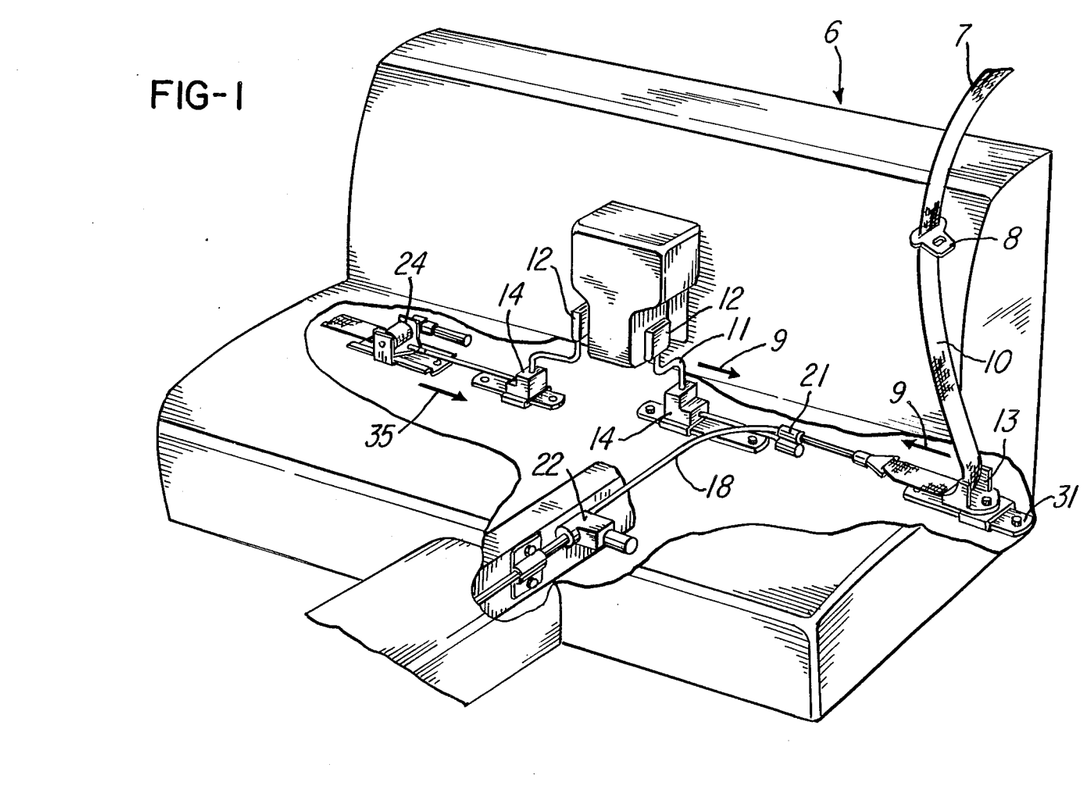
FIG. 1 is a view that illustrates the back seat of an automobile with two different safety belt arrangements.

Referring now to the drawings in detail, FIG. 1 schematically illustrates a back seat 6 of an automobile, with two different safety belt arrangements being secured there. As can be seen in detail in the right half of FIG. 1, a shoulder belt portion 7 extends from a non-illustrated anchoring location on the vehicle, preferably in the form of a self-locking belt reeling mechanism, in the direction toward the seat area of the back seat 6, where the shoulder belt portion 7 changes, at a buckle tongue 8, into a lap belt portion 10 which, in turn, is connected to the vehicle via an anchoring mechanism 13.

Figure 4:
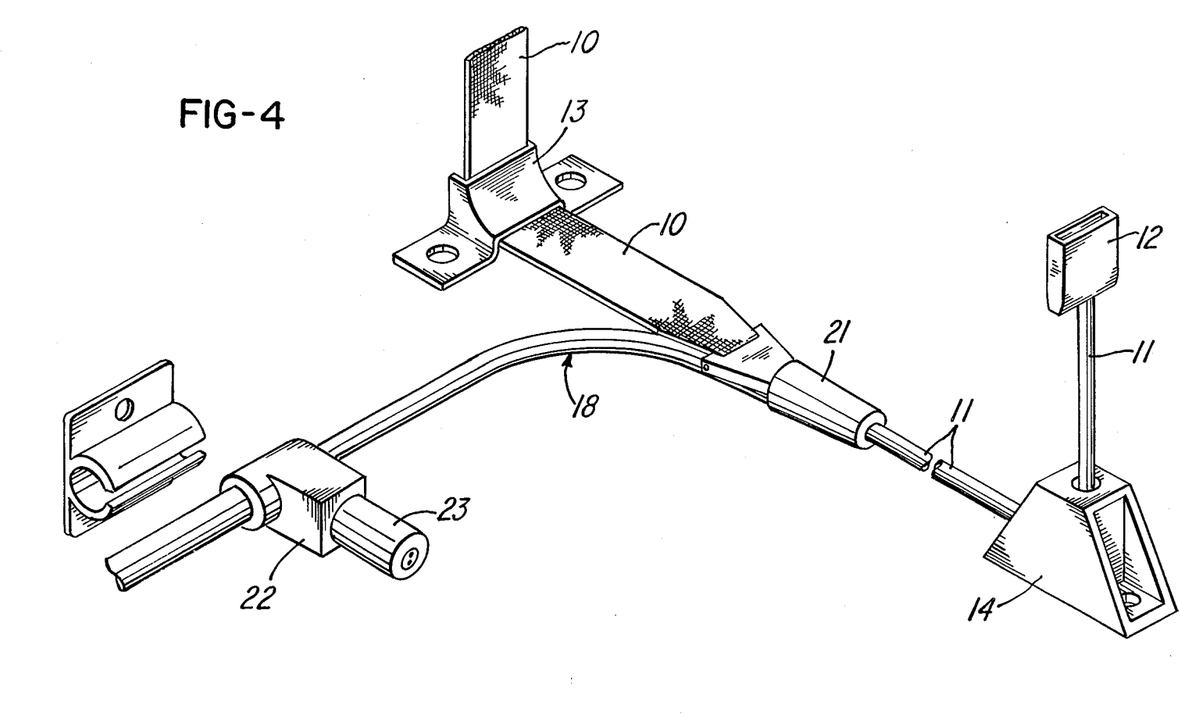
FIG. 4 is a view that shows the arrangement of FIG. 3 with a drive mechanism.

When a person puts on the safety belt, the buckle tongue 8 is placed into a belt buckle lock 12 that is connected to the vehicle via an anchoring member 11 and a guide element 14. As will de described subsequently, not only the anchoring mechansim or guide element 13 for the lap belt 10, but also the guide element 14 for the anchoring member 11, are disposed on guide rails 31 in such a way that they can be moved toward one another in the direction of the arrows 9. Details of the tensioning mechanism of FIG. 1 are shown in FIG. 4, which will be described subsequently.

Also schematically illustrated in FIG. 1, on the left side of the back seat 6, is a different type of arrangement of a tensioning mechanism that is disposed between the associated buckle lock 12 and a non-illustrated anchoring mechanism for the lap belt, with guidance of the belt corresponding to that described for the right half of FIG. 1. For this embodiment, particular reference is made to FIGS. 5 and 6, which will be described in detail subsequently.

One embodiment of an overhung linear tensioner will now be described in detail in conjunction with FIG. 2.

The direction of the lap belt portion 10 is changed at the guide element 13, and the direction of the anchoring member 11 is changed at the guide element 14. A drive mechansim 15 is disposed between the guide elements 13 and 14 for the tensioning movement of the lap belt 10 and the anchoring member 11. The drive mechanism 15 is movably mounted in a support 16 that is secured to the non-illustrated bottom part of a vehicle. The drive mechanism 15 is furthermore held firmly in its rest position by means of appropriately shaped elements 17 that are embodied in such a way that under normal conditions the drive mechanism 15 is held and secured in a rattle-free manner, with a longitudinal displacement of the drive mechanism 15 in the support 16 being effected only in the event that the mechanism is triggered. The drive mechanism 15 itself comprises, in the manner known per se, a guide tube, a piston that is longitudinally movable therein, and a pyrotechnical propellant charge that releases gases in the event that the mechanism is triggered to provide for movement of the piston in the guide tube. Thus, the piston and the guide tube of the drive mechanism 15 are movable relative to one another.

The lap belt 10 is attached to the guide tube of the drive mechanism 15, while the anchoring member 11 is introduced in a suitable manner into the drive mechanism, where it is secured to the piston. This arrangement can, of course, also be reversed. The piston is provided with a return stop, for example via a cutting ring, so that the position achieved after the mechanism is triggered as a result of the relative movement between the piston and the guide tube is retained after the conclusion of the movement.

Figure 2:
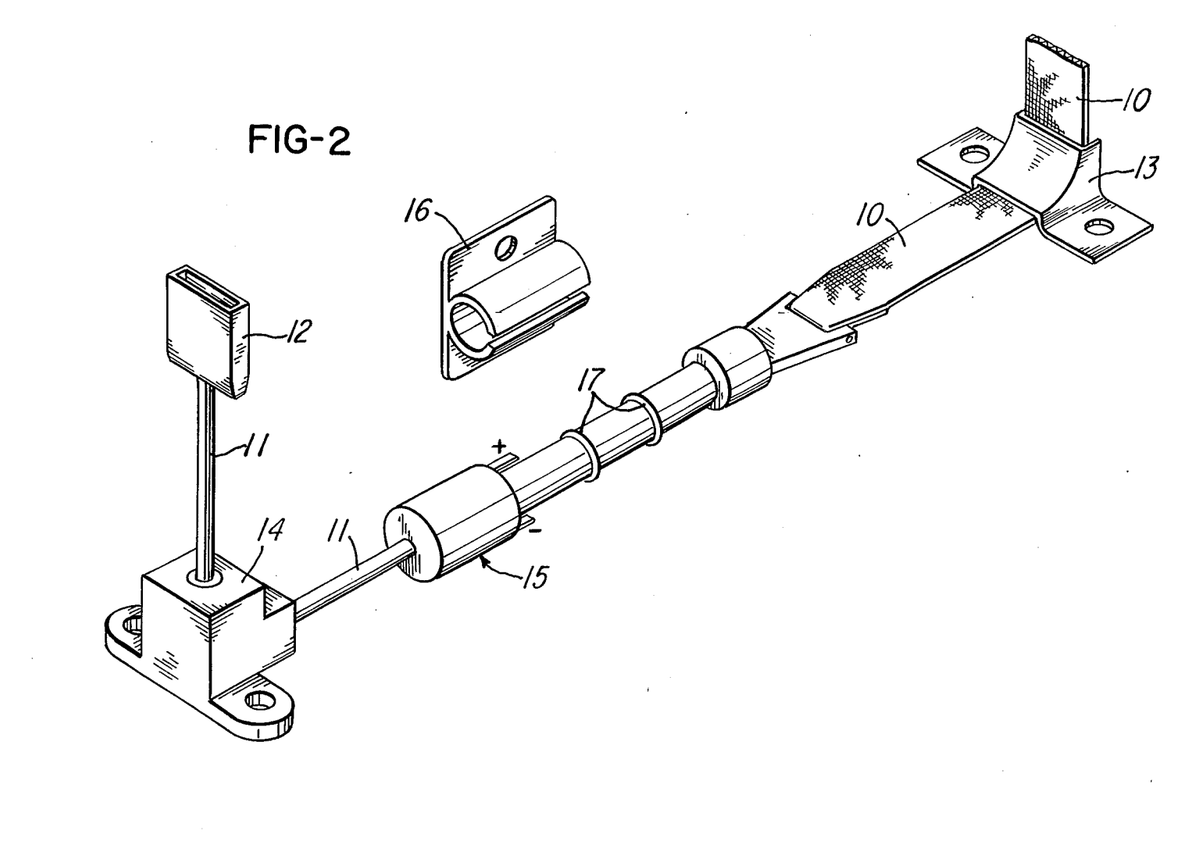
FIG. 2 is a view that shows an overhung arrangement of a tensioning mechanism in the form of a linear tensioner.

The tensioning mechanism illustrated in FIG. 2 operates as follow: as soon as in the event of danger an ignition of the propellant charge in the drive mechanism 15 is effected in the customary manner, the gases propel the piston in the guide tube, resulting in a relative movement between these two components. Depending upon on which side of the drive mechanism 15, i.e. on the side facing the lap belt 10 or on the side facing the anchoring member 11, the resistance is less, in other words the pertaining belt slack is greater, there is effected a movement of the drive mechanism 15 through the support 16 in the direction of either the guide element 13 or the guide element 14 until a force equilibrium is achieved.

Since when the force equilibrium is achieved the lap belt is tensioned, the energy that is still available from the drive mechanism 15 leads to a movement of the buckle lock 12 toward the bottom part of the vehicle. However, due to the tensioned state of the lap belt, this movement is possible only when the belt strap is pulled through the belt tongue, i.e. when the lap belt is lengthened to load the shoulder belt, whereby the adjusted force equilibrium is constantly maintained.

Figure 3:
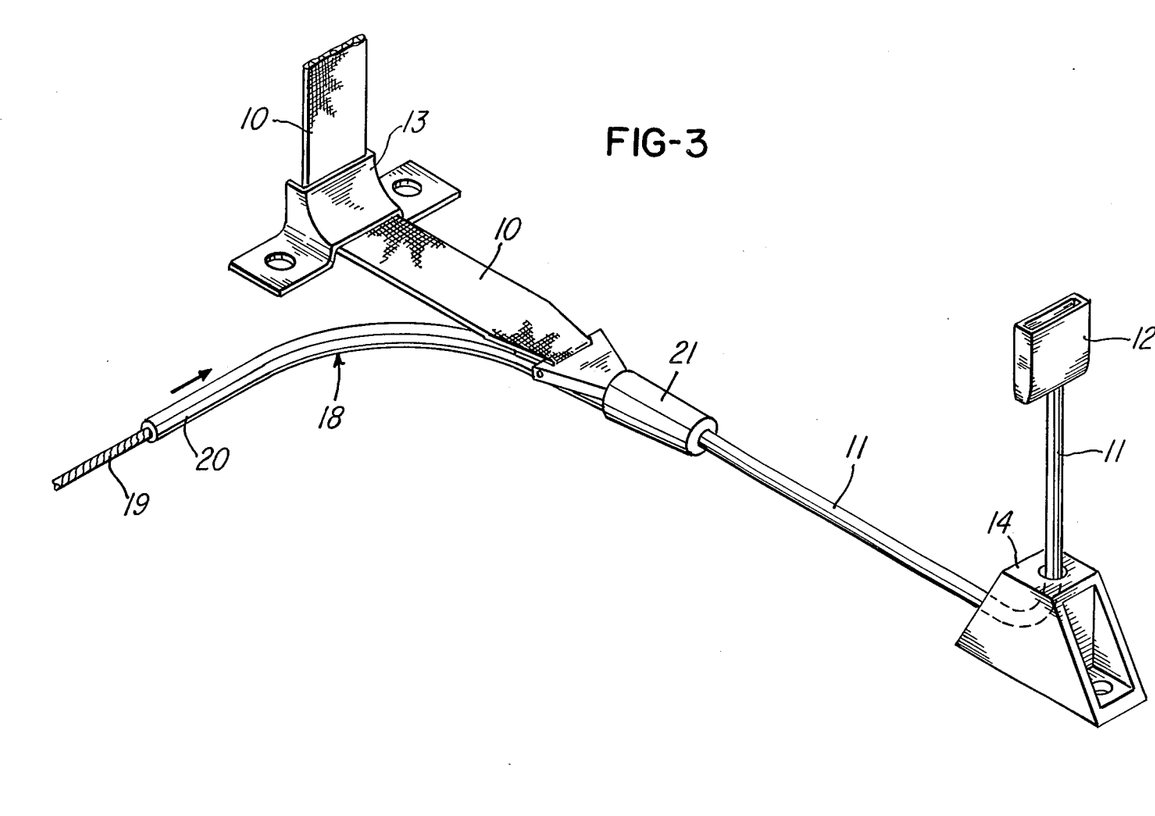
FIG. 3 is a view that shows the tensioning mechanism of FIG. 2 with a transfer element for the drive movement.

In the embodiment illustrated in FIG. 3, the drive mechanism 15 is not disposed in the connection between the guide elements 13 and 14. A Bowden cable 18 having a core 19 that is movable in a conduit 20 is provided as the transfer element for the driving movement. In the illustrated embodiment, the Bowden core 19 is connected with the cable-like anchoring member 11, and the Bowden conduit 20 is connected with the lap belt 10 via a belt strap connector 21. The latter is also provided with a return stop.

In the event that the mechanism is triggered, a pulling force is exerted upon the Bowden core 19 from a drive mechanism that is not illustrated in FIG. 3, and which can comprise movable vehicular matter that can be activated in the event of an accident, or a pyrotechnically driven piston-cylinder unit. As a result of this pulling force, the relative movement between the Bowden conduit and the Bowden core is taken advantage of in order to achieve the described force equilibrium between the lap belt 10 and the anchoring member 11. The Bowden conduit 20 conducts the compressive force onto the belt strap connector 21, while the anchoring member 11, which is connected to the Bowden core 19, is subjected to a pulling force. One specific embodiment of such a configuration is illustrated in FIG. 4, where the Bowden core 19 is connected to the piston of a pyrotechnical piston-cylinder unit 22 that has a gas generator 23 which provides for the movement of the Bowden core 19 and hence for the tensioning movement. The advantage of such an embodiment is that, to the extent necessary due to the space that is available, the drive mechanism 22 can be disposed at any suitable location in the vehicle, such as in or on the channel for the drive shaft.

Figures 5, 6:
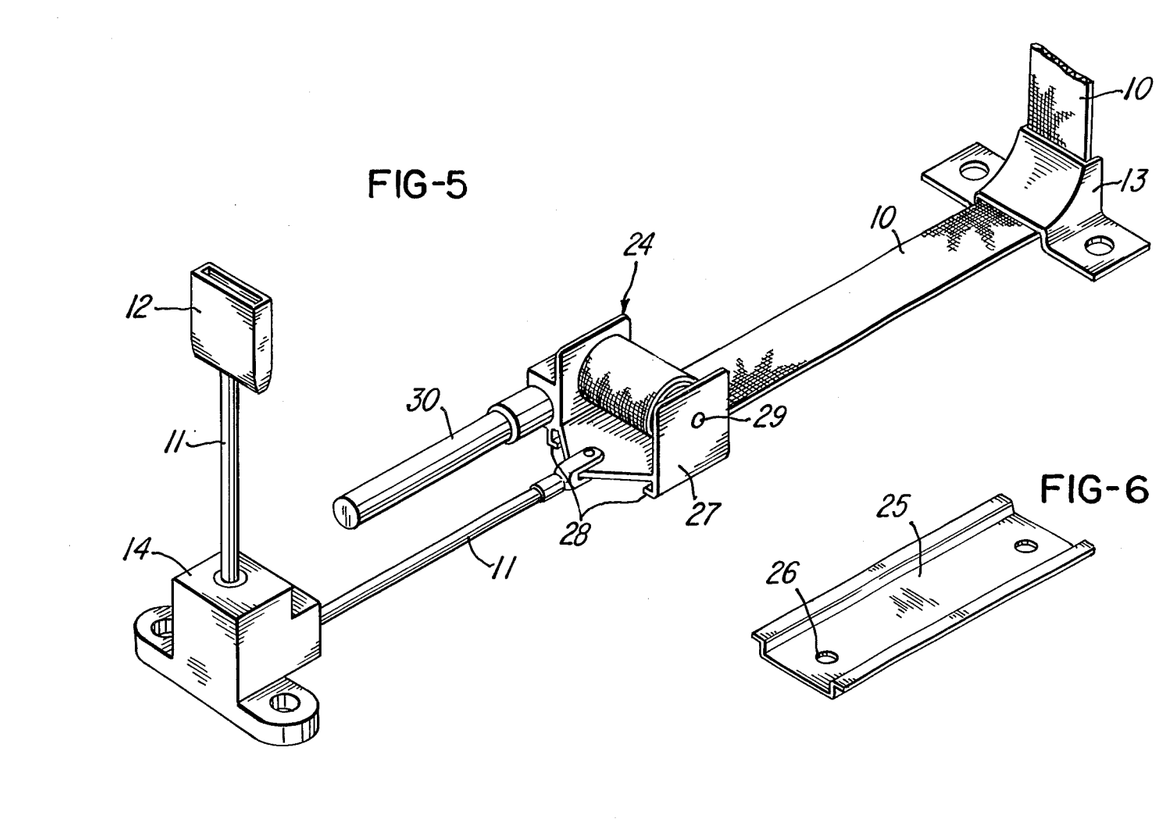
FIG. 5 is a view that shows an overhung arrangement of a tensioning mechanism in the form of a belt reeling mechanism having a rotary tensioner.
FIG. 6 is a view that shows a plan view and side view of the guidance of the belt reeling mechanism of FIG. 5.

FIGS. 5 and 6 illustrate another embodiment, with the linear tensioner being replaced by a belt reeling mechanism having a pyrotechnical rotary tensioning mechanism that acts upon its shaft. Here again the lap belt 10 changes direction at the guide element 13, and the anchoring member 11 changes direction at the guide element 14, with a belt reeling mechanism 24 for the tensioning movement of the lap belt 10 and the anchoring member 11 being disposed between the guide elements 13 and 14. The belt reeling mechanism 24 is movably mounted in a guide rail 25 that is secured to the non-illustrated bottom part of a vehicle. Via bores 26 and similarly non-illustrated connecting means, the guide rail 25 is positively connected with the bottom plate of the vehicle in such a way that the rail 25 is precluded from bowing or bending up between the bores 26. The housing 27 of the belt reeling mechanism 24 is provided with hook-like members 28 that extend around the outwardly bent rail 25 (FIG. 6).

The lap belt 10 is threaded into the belt reeling mechanism 24 and is wound onto a shaft 29 that is mounted in the housing 27. At the same time, the anchoring member 11 is rigidly connected to the housing 27 of the belt reeling mechanism 24. A tensioning mechanism 30 acts upon the shaft 29 of the belt reeling mechanism 24, with the tensioning mechanism 30 being connected to the shaft 29 in a manner known per se. A gas-driven piston in the tensioning mechanism 30 provides for rotary movement of the shaft 29 in the event that the mechanism is triggered. Furthermore, mounted on the shaft 29 is a locking member that can be deflected radially until it engages a locking gear-tooth system that is secured to the housing. This locking member, as a return stop, blocks the shaft from rotating back after the conclusion of the winding movement.

This aforementioned arrangement operates as follows: As soon as in the event of danger an ignition of the propellant charge in the tensioning mechanism 30 of the belt reeling mechanism 24 is effected via a vehicle sensor, the gases drive the piston of the tensioning mechanism 30, and cause the shaft 29 to rotate. Depending upon which position of the safety belt system, i.e. at the lap belt 10 or at the anchoring member 11, the resistance is less, in other words the pertaining belt slack at that location is greater, there is initially effected either a winding up movement of the belt 10 on the shaft 29, or the pulling force tries to bear against the housing 27 and hence on the anchoring member 11. A pulling force exerted in this fashion leads to a displacement of the belt reeling mechanism 24 on the rail 25 in the direction of the guide element 13, so that in such a situation, initially the anchoring member 11 is pulled through the guide element 14, and the buckle lock 12 is moved in the direction of the bottom of the vehicle. In this way there results a tensioning movement of the lap belt as well as of the shoulder belt as a consequence of the change of direction of the buckle lock of the belt strap. This movement sequence is carried out until a force equilibrium is achieved, as already described.

Although not illustrated, the belt reeling mechanism 24 for the lap belt 10 could be advantageously replaced by a known belt reeling mechanism having a vehicle-sensitive or belt strap-sensitive locking system that is provided with automatic retraction of the belt strap. Such an arrangement has the particular advantage that this type of belt reeling mechanism yields or retracts the lap belt after every movement of the person who is strapped in, as is the case with known belt reeling mechanisms of safety belt systems. Thus, the slack of the lap belt is already less right from the start, as a consequence of which the tensioning of the lap belt pursuant to the present invention operates even more effectively.

Figures 7, 8, 9:
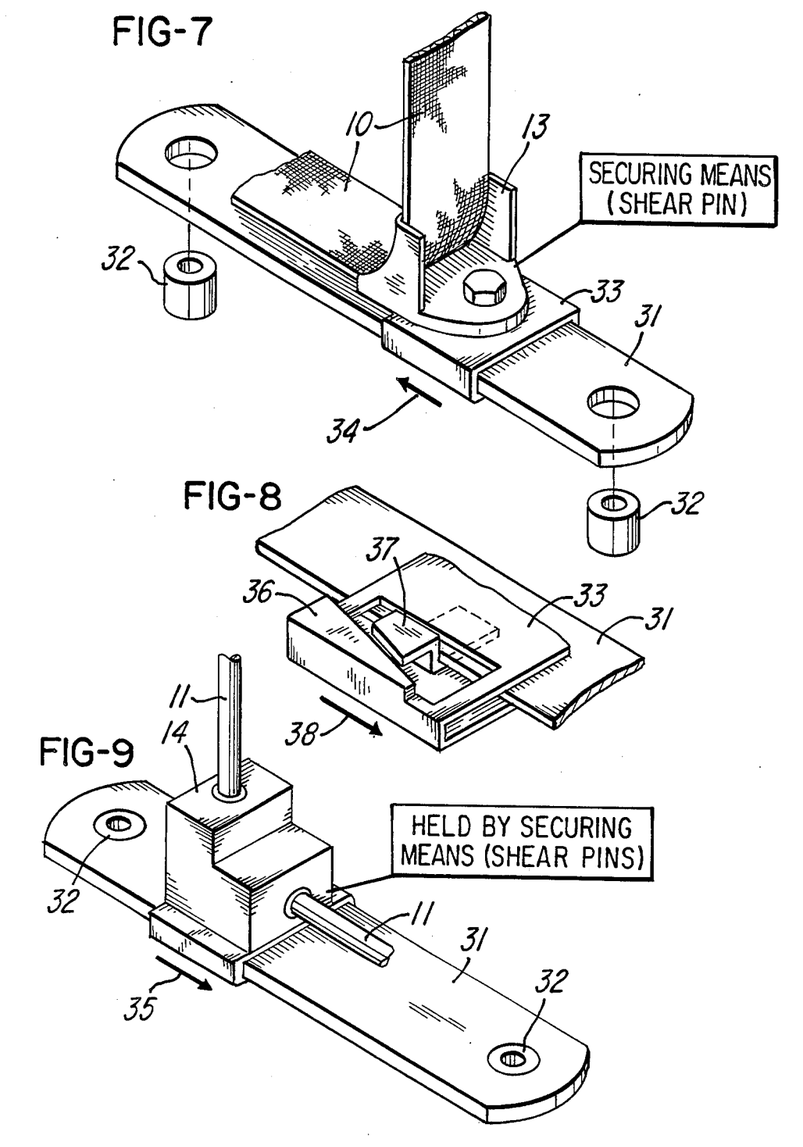
FIG. 7 is a view that shows a guide rail for the movement of the guide elements.
FIG. 8 is a partial view of the sliding carriage of the guide rail.
FIG. 9 is a view that shows the guide rail of FIG. 7 for another exemplary embodiment.

FIGS. 7 to 9 show how, in addition to the overhung arrangement of the tensioning mechanisms 15, 23, and 24, the respective guide elements 13 and 14 for the lap belt portion 10 and the anchoring member 11 can be disposed in a movable manner. For this purpose, for each element 13, 14 there is provided a guide rail 31 that is mounted on the vehicle via bushings 32. A sliding carriage 33 is movably disposed on the guide rail 31 as a carrier for the respective guide element 13, 14. As can be seen in detail in FIG. 7, the sliding carriage 33 illustrated there supports the guide element 13 for the lap belt 10, with the latter being guided in the direction of the arrow 34 to the tensioning mechanism 15 in conformity with the illustration of FIG. 2. A corresponding arrangement is shown in FIG. 9, where the sliding carriage 33 with the guide element 14 for the anchoring member 11 is movable in the direction of the arrow 35.

As shown in detail in FIG. 8, the sliding carriages 33 and guide rails 31 are prevented via a return stop from moving counter to the direction of the arrows 34 35. Such a return stop includes two cooperating wedge-like members 36, 37, with the member 36 being positively connected with the sliding carriage 33, with the further member 37 that is disposed on the associated wedge surface under yielding preload, being inserted against the guide rail 31 between the latter and the sliding carriage 33, which extends around the guide rail in a U-shaped manner. This provides a cooperating locking action when the sliding carriage moves in the direction of the arrow 38.

Although not illustrated in detail, yet already described in connection with the overhung arrangement of a tensioning mechanism, the sliding carriages 13 are also secured in the guide rails 31 by shear pins which are of such a size that they do not shear until the tensioning mechanism has been triggered, whereupon the movement of the sliding carriages 33 with the associated guide elements 13, 14 is released.

The present invention is, of course, in no way restricted to the specific disclosure of the specification and drawings, but also encompasses any modifications within the scope of the appended claims.

What we claim is:

1. A safety belt arrangement for installation in a vehicle having a bottom portion, including a safety belt system having therewith a lap belt as an integral portion of the belt system, said lap belt including two ends therewith as lap belt segments made taut by tightening in a pelvic belt ring configuration; said arrangement comprising:

a first anchoring member, which is operatively secured to said vehicle; said first anchoring member being in the form of a first guide element, with a first one of said ends of said lap belt being guided by said first guide element, while the other end of said lap belt is provided with a first belt buckle part;

a second guide element, which is also operatively secured to said vehicle;

a second anchoring member, which is in the form of a cable section, is guided by said second guide element, and is provided with a second belt buckle part that cooperates with said first belt buckle part of said lap belt; and a tensioning mechanism that is movable relative to said first and second guide elements that interconnects said first end of said lap belt, on said side of said first guide element remote from said other end of said lap belt, and a portion of said second anchoring member that is remote from said second buckle part; said tensioning mechanism including an element movable therein and operating displaceable between said first and second guide elements when relative movement therebetween occurs in opposite directions, said first end of said lap belt, and that portion of said second anchoring member remote from said second buckle part, being respectively freely displaceable as movement in opposite directions occurs between their associated guide elements as positioned in an overhung arrangement with respect to each other, and being movable relative to one another only during cooperating engagement of said first and second belt buckle parts including therewith said first end of said lap belt connected with said first guide element and said other end of said lap belt connected to said second anchoring member for said first and second belt buckle parts to have a relative movement dependent as to direction in which resistance is less, in other words where pertaining belt slack is greater until a force equilibrium is achieved.

2. A safety belt arrangement for installation in a vehicle having a bottom portion, including a safety belt system having therewith a lap belt as an integral portion of the belt system, said lap belt including two ends therewith; said arrangement comprising:

a first anchoring member, which is operatively secured to said vehicle; said first anchoring member being in the form of a first guide element, with a first one of said ends of said lap belt being guided by said first guide element, while the other end of said lap belt is provided with a first belt buckle part;

a second guide element, which is also operatively secured to said vehicle;

a second anchoring member, which is in the form of a cable section, is guided by said second guide element, and is provided with a second belt buckle part that cooperates with said first belt buckle part of said lap belt;

a tensioning mechanism that interconnects said first end of said lap belt, on that side of said first guide element remote from said other end of said lap belt, and a portion of said second anchoring member that is remote from said second buckle part; said tensioning mechanism including an element movable therein and operating displaceable between said first and second guide elements when relative movement therebetween occurs in opposite directions, said first end of said lap belt, and that portion of said second anchoring member remote from said second buckle part, being respectively freely displaceable as movement in opposite directions occurs between their associated guide elements as positioned in an overhung arrangement with respect to each other, and being movable relative to one another only during cooperating engagement of said first and second belt buckle parts including therewith said first end of said lap belt being connected to said first guide element and said other end of said lap belt being connected to said second anchoring member for said first and second belt buckle parts to have a relative movement in a direction of smaller resistance to eliminate belt slack; and support means secured to the bottom portion of said vehicle; said tensioning mechanism being in the form of a pyrotechnical linear tensioner that includes a drive mechanism that is disposed in said support means in such a way that is longitudinally displaceable and is positioned in the overhung arrangement between said guide elements; said drive mechanism being provided with a pyrotechnical propellant charge, and includes exclusively a piston and a cylinder, with said first end of said lap belt being connected only to said cylinder, and that portion of said second anchoring member that is remote from said second buckle part being connected only to said piston.

3. A safety belt arrangement for installation in a vehicle having a bottom portion, including a safety belt system having therewith a lap belt as an integral portion of the belt system, said lap belt including two ends therewith; said arrangement comprising:

a first anchoring member, which is operatively secured to said vehicle; said first anchoring member being in the form of a first guide element, with a first one of said ends of said lap belt being guided by said first guide element, while the other end of said lap belt is provided with a first belt buckle part;

a second guide element, which is also operatively secured to said vehicle;

a second anchoring member, which is in the form of a cable section, is guided by said second guide element, and is provided with a second belt buckle part that cooperates with said first belt buckle part of said lap belt;

a tensioning mechanism that interconnects said first end of said lap belt, on that side of said first guide element remote from said other end of said lap belt, and a portion of said second anchoring member that is remote from said second buckle part; said tensioning mechanism including an element movable therein and operating displaceable between said first and second guide elements when relative movement therebetween occurs in opposite directions, said first end of said lap belt, and that portion of said second anchoring member remote from said second buckle part, being respectively freely displaceable as movement in opposite directions occurs between their associated guide elements as positioned in an overhung arrangement with respect to each other, and being movable relative to one another only during cooperating engagement of said first and second belt buckle parts including therewith said first end of said lap belt being connected to said first guide element and said other end of said lap belt being connected to said second anchoring member for said first and second belt buckle parts to have a relative movement in a direction of smaller resistance to eliminate belt slack; and said tensioning mechanism including a drive mechanism that is not disposed in a direct line between said guide elements, and further including a transfer element that is connected to said drive mechanism and comprises a cable means including a conduit and a core that is movable relative to the conduit; said core being connected to that portion of said second anchoring member that is remote from said second buckle part, and said conduit being connected to said first end of said lap belt via a belt strap connector.

4. A safety belt arrangement for installation in a vehicle having a bottom portion, including a safety belt system having therewith a lap belt as an integral portion of the belt system, said lap belt including two ends therewith; said arrangement comprising:

a first anchoring member, which is operatively secured to said vehicle; said first anchoring member being in the form of a first guide element, with a first one of said ends of said lap belt being guided by said first guide element, while the other end of said lap belt is provided with a first belt buckle part;

a second guide element, which is also operatively secured to said vehicle;

a second anchoring member, which is in the form of a cable section, is guided by said second guide element, and is provided with a second belt buckle part that cooperates with said first belt buckle part of said lap belt;

a tensioning mechanism that interconnects said first end of said lap belt, on that side of said first guide element remote from said other end of said lap belt, and a portion of said second anchoring member that is remote from said second buckle part; said tensioning mechanism including an element movable therein and operating displaceable between said first and second guide elements when relative movement therebetween occurs in opposite directions, said first end of said lap belt, and that portion of said second anchoring member remote from said second buckle part, being respectively freely displaceable as movement in opposite directions occurs between their associated guide elements as positioned in an overhung arrangement with respect to each other, and being movable relative to one another only during cooperating engagement of said first and second belt buckle parts including therewith said first end of said lap belt being connected to said first guide element and said other end of said lap belt being connected to said second anchoring member for said first and second belt buckle parts to have a relative movement in a direction of smaller resistance to eliminate belt slack; and guide rail means connected to the bottom portion of said vehicle, said guide elements being disposed on said guide rail means in such a way that they are displaceable towards one another.

5. A safety belt arrangement according to claim 4, which also includes return stop means for said guide elements; and which includes securing means for holding said guide elements in a starting position and for releasing them when a predetermined load thereon is encountered.

6. A safety belt arrangement according to claim 5, which includes a respective carriage for each of said guide elements, with each of said carriages being longitudinally displaceably disposed on said guide rail means.

7. A safety belt arrangement according to claim 6, in which a securing means hold said carriages in position, and are in the form of shear pins that shear off, to release said carriages, when said tensioning mechanism is triggered when a predetermined load is encountered.

8. A safety belt arrangement according to claim 6, in which return stop means are respectively disposed between a given carriage and said guide rail means, and comprise wedge-like members that wedge against one another in a locking direction; one of said wedge-like members is positively connected to said carriage, and the other of said wedge-like members is yieldingly prestressed relative to said guide rail means.

* * * * *